United States Patent Office 3,174,822
Patented Mar. 23, 1965

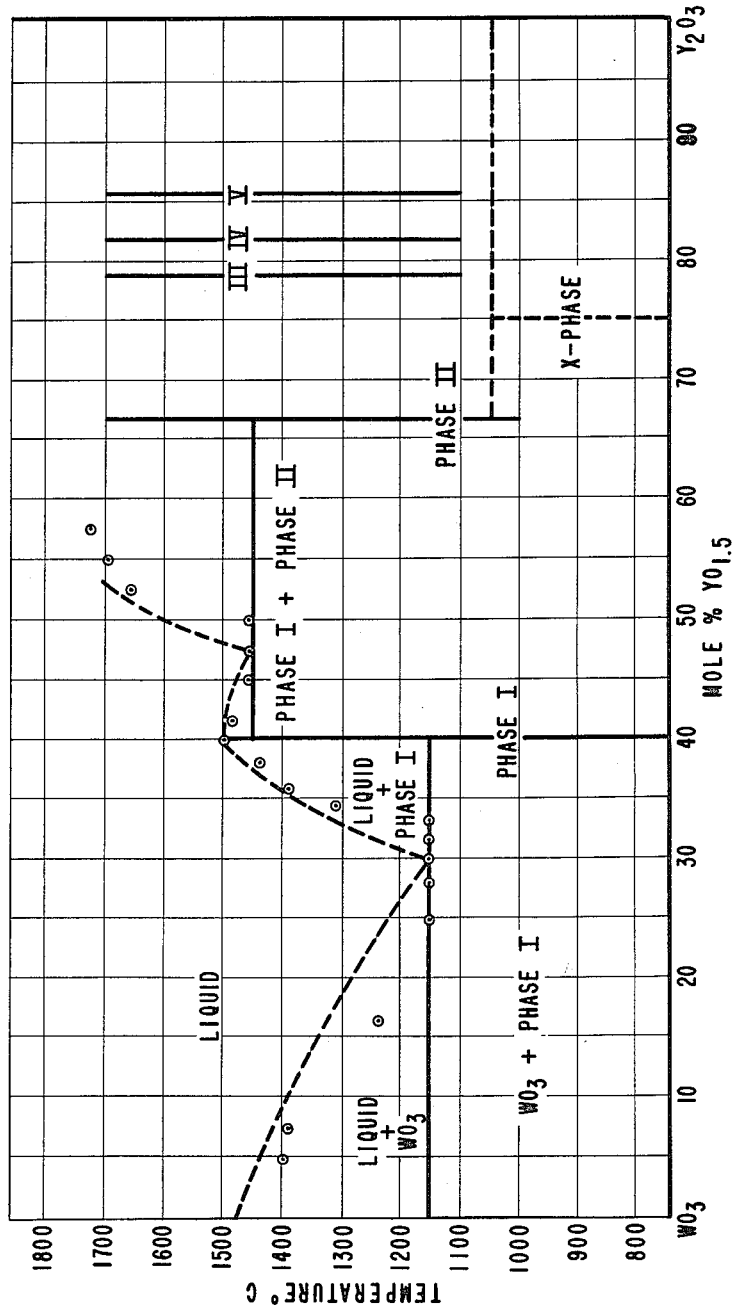

3,174,822
DOUBLE OXIDES OF YTTRIUM AND TUNGSTEN
Hans J. Borchardt, Wilmington, Del., assignor to E. I. du Pont de Nemours and Company, Wilmington, Del., a corporation of Delaware
Filed Feb. 14, 1961, Ser. No. 89,164
4 Claims. (Cl. 23—50)

This invention relates to a new class of oxide compositions. More particularly, this invention relates to double oxide compounds of yttrium oxide and tungstic oxide.

Oxides as a class are the most important high temperature materials now available and promise to retain this position because of their stability in oxidizing atmospheres.

Therefore, it is an object of this invention to provide entirely new double oxide compositions with useful properties. It is a further object of the invention to provide novel double oxide compositions which are the reaction products of yttrium oxide and tungstic oxide. Other and additional objects will become apparent from a consideration of the following detailed description.

These objects are accomplished in accordance with this invention which provides as a new composition of matter, a double oxide compound selected from the group consisting of $WO_3 \cdot Y_2O_3$, $WO_3 \cdot 3Y_2O_3$, $3WO_3 \cdot Y_2O_3$, $4WO_3 \cdot 9Y_2O_3$ and $8WO_3 \cdot 15Y_2O_3$.

The process leading to these novel compounds employs standard ceramic techniques and simply involves contacting an intimate mixture of the powdered oxides of yttrium and tungsten in appropriate concentrations, pressing said oxide mixtures into a desired shape, and heating said masses in air at atmospheric pressures at elevated temperatures.

The term "double oxide compound" is used herein to designate the composition of this invention which conforms to the formula $WO_3 \cdot xY_2O_3$ wherein $x$ may be one of the numbers 1/3, 1, 15/8, 9/4 and 3. It is used herein to denote the compound composed of yttrium oxide and tungstic oxide radicals.

It will be understood that instead of adding the oxides as such, chemically equivalent amounts of compounds of the metals concerned may be added. These are then converted to the oxides during heating to the firing temperature. Such compounds may be organic or inorganic. Examples in the case of yttrium are yttrium carbonate, yttrium oxalate, yttrium hydroxide and the like and in the case of tungsten, tungstic acid, ammonium tungstate, organic derivatives of tungstic acids, etc. The two oxides, or compounds liberating the same, are intimately mixed by any of the methods known to the ceramic art. The materials of the mixture are preferably both in a finely divided state, and dry mixing is preferred over wet mixing. To the mixture of the oxides, a suitable binder, usually in a solvent, is added in an amount sufficient to allow the mixture to be cast or pressed into the desired shape. Binders suitable for this purpose are well known and include solutions of waxy materials such as paraffin, solutions of stearic acid, camphor, starch and the like. A solution of paraffin in petroleum ether has been found satisfactory for this purpose. The binder remains during the pressing technique but escapes during firing.

The preparative procedure utilizes tungstic oxide and yttrium oxide or the equivalent compounds in essentially stoichiometric quantities as determined by the molar ratios of the oxides in each of the compositions. This represents preferred operating procedure, providing each product in essentially pure form. However, it can be seen from data summarized in Table I that each phase forms over a range of compositions. For instance, the compound, $3WO_3 \cdot Y_2O_3$, forms as a product in mixtures containing from about 2.4 to 49 mole percent yttrium oxide. In the lower concentration, i.e., up to about 25 mole percent yttrium oxide, the compound occurs with tungstic oxide. Stoichiometric mixtures provide the pure compound, whereas in starting mixtures containing excess yttrium oxide, the compound occurs with a new phase, $WO_3 \cdot Y_2O_3$. The concentrations over which the compound, $WO_3 \cdot Y_2O_3$, forms range from about 25.3 to 64.3 mole percent yttrium oxide. Starting mixtures containing from about 51.3 to 68.8 mole percent yttrium oxide yield the compound $8WO_3 \cdot 15Y_2O_3$; those containing about 65.6 to 70.1 mole percent yttrium oxide, the $4WO_3 \cdot 9Y_2O_3$; and those containing about 70 to 98 mole percent yttrium oxide, the compound $WO_3 \cdot 3Y_2O_3$. In each instance, stoichiometric mixtures provide the pure phase and those which deviate appreciably from stoichiometry, a mixture of two phases.

TABLE I

| Mole Percent $Y_2O_3$ | W-Y Ratio | Firing Temperature (° C.) | Product |
| --- | --- | --- | --- |
| 2.44 | 20-1 | 1,100 | $WO_3$+I. |
| 23.8 | 1.6-1 | 1,100 | $WO_3$+I. |
| 25.0 | 1.5-1 | 1,100 | I. |
| 25.3 | 1.4-1 | 1,100 | I+II. |
| 48.7 | 1-1.9 | 1,400 | I+II. |
| 50.0 | 1-2 | 1,400 | II. |
| 51.3 | 1-2.1 | 1,400 | II+III. |
| 64.3 | 1-3.6 | 1,400 | II+III. |
| 64.8 | 1-3.7 | 1,400 | III. |
| 65.2 | 1-3.75 | 1,400 | III. |
| 65.6 | 1-3.8 | 1,400 | III+IV. |
| 68.8 | 1-4.4 | 1,400 | III+IV. |
| 69.3 | 1-4.5 | 1,400 | IV. |
| 69.7 | 1-4.6 | 1,400 | IV. |
| 70.1 | 1-4.7 | 1,400 | IV+V. |
| 72.3 | 1-5.2 | 1,400 | IV+V. |
| 73.0 | 1-5.4 | 1,400 | IV+V. |
| 75.7 | 1-6.2 | 1,400 | V. |
| 76.2 | 1-6.4 | 1,400 | V+$Y_2O_3$. |
| 98.0 | 1-100 | 1,400 | V+$Y_2O_3$. |

Legend: I=$3WO_3 \cdot Y_2O_3$; II=$WO_3 \cdot Y_2O_3$; III=$8WO_3 \cdot 15Y_2O_3$; IV=$4WO_3 \cdot 9Y_2O_3$; V=$WO_3 \cdot 3Y_2O_3$.

These data, together with additional data obtained from high temperature studies of intermediate compositions, are tabulated graphically in FIGURE 1. This represents a pseudobinary temperature-composition diagram for the system tungstic oxide-yttrium oxide. The compounds are represented by lines rather than by areas, reflecting the fact that no evidence for homogeneity ranges can be obtained by X-ray diffraction procedures.

Purely for practical reasons, the firing step is carried out at temperatures between about 900° and 1400° C., depending to a certain extent upon the composition of the starting mixture. Generally, samples containing more than 25 mole percent yttrium oxide are heated at 1400° C. and those containing less yttrium oxide at 1100° C. The use of 1100° C. in the latter instance is chosen only to avoid the presence of a liquid phase in the course of the reaction, a eutectic being formed in this range between $WO_3$ and $3WO_3 \cdot Y_2O_3$ which melts at about 1155° C. However, the presence of the liquid phase represents an inconvenience—not a limitation—and does not impair the formation of the compound $3WO_3 \cdot Y_2O_3$. Therefore, the higher synthesis temperatures may be employed if desired. The above stated temperatures are the most satisfactory from a process point of view, since the compounds form in reasonable periods of time and since the systems under these conditions appear to represent equilibrium situations. However, the phases are seen to form at both higher and lower temperatures. For example, $$3WO_3 \cdot Y_2O_3$$

may be prepared from a stoichiometric mixture by heating at 750° C. for 22 hours or at 900° C. for 30 minutes; $WO_3 \cdot Y_2O_3$ is detected in a stoichiometric mixture after heating at 1100° C. for 24 hours, although the transition is complete only after one week at this temperature; $8WO_3 \cdot 15Y_2O_3$ is formed from a stoichiometric mixture by heating at 1100° C. for 24 hours; and any of the compounds $8WO_3 \cdot 15Y_2O_3$, $4WO_3 \cdot 9Y_2O_3$ and $WO_3 \cdot 3Y_2O_3$ may be obtained by firing mixtures containing stoichiometric proportions of the respective oxides at 1700° C. for less than 2 hours.

The method of preparation will be illustrated with a specific example which is typical of the method for preparing any of the materials of the present invention, yet is not intended to limit the same. The example deals with the preparation of the compound $WO_3 \cdot Y_2O_3$.

*Example 1*

Yttrium oxide (0.9129 part by weight, particle size approximately $2\mu$ as measured in a Fischer subsieve sizer) and 1.000 part by weight of tungstic oxide (particle size approximately $8\mu$) are mixed dry on a vibrating mixer for approximately 3 minutes. A paste is made by adding a 0.5% solution of paraffin in petroleum ether, and the mixture is pressed into the form of a pellet in a die. The pellet is slowly heated in air in platinum to 300–400° C. at a rate of about 20° C. per minute to allow the binder to burn off slowly, and then the temperature is increased to 1000° C. for 1 hour. Heating at this temperature imparts green strength. The pellet is then transferred to a silicon carbide resistance furnace where heating in air is continued at 1400° C. for 4 hours. X-ray examination indicates the presence of only one phase, $WO_3 \cdot Y_2O_3$.

To characterize the compounds of this invention and to establish at which compositions single phases form, X-ray powder diffraction techniques have been utilized, and those skilled in the art will be aware of the limitations therein. It is recognized, for instance, that X-ray powder patterns may not reveal the presence of a phase unless about five percent of that phase is present. Because the stoichiometric formula of each phase herein described has been established by the molar ratios of the oxides yielding only one phase as detected by powder diffraction, it is possible, although not likely, that the stated formulae may deviate by an amount consistent with this limitation and should be so interpreted.

The new binary oxides of this invention are white, crystalline substances, having crystal structures substantially different from either of the oxide components. They appear to be thermodynamically stable at their temperature of formation, forming spontaneously from their parent oxides, and there is no indication of any structural changes even after the compounds have been heated for at least a week at 1400° C. X-ray powder patterns of each of these phases which serve for their characterization are given in Tables II, III, IV, V and VI. It appears that, unlike the others, the compound $WO_3 \cdot 3Y_2O_3$ undergoes a phase transformation between 1400° C. and its melting point. The X-ray pattern obtained when this compound is solidified from its melt is not that of the original compound, of yttrium oxide or of any other previously encountered phase. The pattern contains very few lines and can be indexed on the basis of a face-centered cubic unit cell. The most likely explanation is that this is a frozen-in high temperature phase of $WO_3 \cdot 3Y_2O_3$.

TABLE II

X-RAY DIFFRACTION DATA

[Phase I (W:Y=3:2)]

| Line No. | $2\theta^*$ | d | $I/I_0$ |
|---|---|---|---|
| 1 | 13.1 | 6.75 | 60 |
| 2 | 14.2 | 6.23 | 30 |
| 3 | 18.7 | 4.74 | 30 |
| 4 | 19.2 | 4.62 | 5 |
| 5 | 20.3 | 4.37 | 60 |
| 6 | 20.9 | 4.25 | 30 |
| 7 | 21.2 | 4.19 | 40 |
| 8 | 21.6 | 4.11 | 100 |
| 9 | 21.9 | 4.06 | 80 |
| 10 | 23.3 | 3.81 | 30 |
| 11 | 23.7 | 3.75 | 55 |
| 12 | 23.9 | 3.72 | 55 |
| 13 | 25.4 | 3.50 | 70 |
| 14 | 26.4 | 3.37 | 70 |
| 15 | 28.2 | 3.16 | 50 |
| 16 | 28.6 | 3.12 | 50 |
| 17 | 30.9 | 2.89 | 40 |
| 18 | 31.7 | 2.82 | 40 |
| 19 | 37.3 | 2.41 | 20 |
| 20 | 44.0 | 2.056 | 20 |
| 21 | 44.8 | 2.021 | 20 |

*$CuK_\alpha$ radiation.

TABLE III

X-RAY DIFFRACTION DATA

[Phase II (W:Y=1:2)]

| Line No. | $2\theta^*$ | d | $I/I_0$ |
|---|---|---|---|
| 1 | 17.55 | 5.05 | 20 |
| 2 | 18.54 | 4.78 | 20 |
| 3 | 20.57 | 4.31 | 2 |
| 4 | 20.99 | 4.23 | 10 |
| 5 | 22.50 | 3.95 | 15 |
| 6 | 23.23 | 3.83 | 15 |
| 7 | 24.25 | 3.66 | 20 |
| 8 | 28.10 | 3.17 | 2 |
| 9 | 28.93 | 3.08 | 90 |
| 10 | 29.55 | 3.02 | 100 |
| 11 | 32.22 | 2.77 | 10 |
| 12 | 32.55 | 2.75 | 25 |
| 13 | 33.60 | 2.66 | 25 |
| 14 | 34.35 | 2.61 | 10 |
| 15 | 35.55 | 2.52 | 20 |
| 16 | 36.15 | 2.48 | 2 |
| 17 | 38.15 | 2.36 | 5 |
| 18 | 41.40 | 2.179 | 2 |
| 19 | 41.95 | 2.151 | 10 |
| 20 | 42.40 | 2.130 | 10 |
| 21 | 43.35 | 2.085 | 2 |
| 22 | 44.05 | 2.054 | 2 |
| 23 | 44.55 | 2.032 | 5 |
| 24 | 45.45 | 1.994 | 5 |
| 25 | 45.85 | 1.977 | 5 |
| 26 | 47.45 | 1.914 | 20 |
| 27 | 48.15 | 1.888 | 15 |
| 28 | 49.15 | 1.852 | 5 |
| 29 | 49.70 | 1.833 | 40 |
| 30 | 50.20 | 1.816 | 2 |
| 31 | 51.3 | 1.779 | 10 |
| 32 | 52.15 | 1.752 | 2 |
| 33 | 52.75 | 1.734 | 10 |
| 34 | 54.15 | 1.692 | 5 |
| 35 | 54.50 | 1.682 | 5 |

*$CuK_\alpha$ radiation.
NOTE.—Lines 16-35 appear to be closely spaced double lines.

TABLE IV

X-RAY DIFFRACTION DATA

[Phase III (W:Y=1:3.75)]

| Line No. | $2\theta^*$ | d | $I/I_0$ |
|---|---|---|---|
| 1 | 13.7 | 6.46 | 4 |
| 2 | 16.9 | 5.24 | 5 |
| 3 | 23.65 | 3.76 | 10 |
| 4 | 26.0 | 3.42 | 5 |
| 5 | 28.55 | 3.12 | 40 |
| 6 | 29.6 | 3.01 | 100 |
| 7 | 31.9 | 2.80 | 4 |
| 8 | 34.0 | 2.63 | 50 |
| 9 | 43.8 | 2.065 | 2 |
| 10 | 45.8 | 1.979 | 2 |
| 11 | 47.0 | 1.932 | 2 |
| 12 | 47.7 | 1.905 | 5 |
| 13 | 48.1 | 1.890 | 35 |
| 14 | 49.4 | 1.843 | 35 |
| 15 | 50.7 | 1.799 | 2 |
| 16 | 56.9 | 1.617 | 10 |
| 17 | 58.0 | 1.589 | 30 |
| 18 | 58.6 | 1.574 | 15 |
| 19 | 61.3 | 1.511 | 10 |

*$CuK_\alpha$ radiation.

TABLE V
X-RAY DIFFRACTION DATA
[Phase IV (W:Y=1:4.5)]

| Line No. | 2θ* | d | I/I₀ |
|---|---|---|---|
| 1 | 13.0 | 6.80 | 4 |
| 2 | 13.6 | 6.51 | 2 |
| 3 | 16.7 | 5.30 | 5 |
| 4 | 24.0 | 3.70 | 2 |
| 5 | 24.5 | 3.63 | 4 |
| 6 | 25.3 | 3.52 | 2 |
| 7 | 25.8 | 3.45 | 2 |
| 8 | 27.3 | 3.26 | 2 |
| 9 | 28.5 | 3.13 | 25 |
| 10 | 29.2 | 3.06 | 100 |
| 11 | 29.4 | 3.04 | 100 |
| 12 | 33.8 | 2.65 | 60 |
| 13 | 48.0 | 1.894 | 20 |
| 14 | 48.7 | 1.868 | 35 |
| 15 | 49.3 | 1.847 | 20 |
| 16 | 56.9 | 1.617 | 5 |
| 17 | 57.9 | 1.591 | 35 |
| 18 | 58.5 | 1.576 | 10 |
| 19 | 60.6 | 1.527 | 5 |
| 20 | 61.2 | 1.513 | 5 |
| 21 | 71.3 | 1.321 | 5 |

*CuKα radiation.

TABLE VI
X-RAY DIFFRACTION DATA
[Phase V (W:Y=1:6)]

| Line No. | 2θ* | d | I/I₀ |
|---|---|---|---|
| 1 | 13.8 | 6.41 | 2 |
| 2 | 14.1 | 6.28 | 10 |
| 3 | 21.8 | 4.07 | 20 |
| 4 | 23.1 | 3.85 | 15 |
| 5 | 23.5 | 3.78 | 2 |
| 6 | 28.7 | 3.11 | 45 |
| 7 | 29.5 | 3.03 | 100 |
| 8 | 31.7 | 2.82 | 10 |
| 9 | 34.0 | 2.63 | 50 |
| 10 | 39.6 | 2.274 | 5 |
| 11 | 40.1 | 2.247 | 2 |
| 12 | 43.3 | 2.088 | 15 |
| 13 | 44.4 | 2.039 | 10 |
| 14 | 47.4 | 1.916 | 2 |
| 15 | 48.1 | 1.890 | 15 |
| 16 | 48.3 | 1.883 | 35 |
| 17 | 48.5 | 1.875 | 30 |
| 18 | 49.4 | 1.843 | 40 |
| 19 | 49.5 | 1.840 | 35 |
| 20 | 50.1 | 1.819 | 5 |
| 21 | 51.0 | 1.789 | 10 |
| 22 | 55.6 | 1.651 | 5 |
| 23 | 56.9 | 1.617 | 5 |
| 24 | 57.2 | 1.609 | 15 |
| 25 | 57.3 | 1.606 | 10 |
| 26 | 58.1 | 1.586 | 30 |
| 27 | 58.3 | 1.581 | 20 |
| 28 | 58.6 | 1.574 | 20 |
| 29 | 58.7 | 1.571 | 15 |

*CuKα radiation.

The compound $3WO_3 \cdot Y_2O_3$ melts congruently at $1495 \pm 5°$ C. and has a density of 5.8 g./cm., considerably less than the weighted mean density of the constituent oxides. It has the interesting property of being far less volatile than $WO_3$ itself. For example, at 1400° C., the measured rate of volatilization of the mixed oxide is $1.1 \pm 0.1 \times 10^{-7}$ g./sec. cm.$^2$, whereas the tungstic oxide volatilization, measured under the same set of conditions, is $4.7 \pm 0.2 \times 10^{-4}$ g./sec. cm.$^2$. Tungstic oxide is essentially stabilized with respect to volatilization by forming this mixed oxide. This mixed oxide is useful as a ceramic coating material especially applied over substrates such as tungsten metal by flame spraying to improve their oxidative stability.

The compound $WO_3 \cdot Y_2O_3$ is a white solid that melts incongruently at about 1700° C. The solid is luminescent upon exposure to short wave length ultraviolet radiation, for example 2537 A. light, and to X-rays. The luminescent oxide is useful as an X-ray detector and as a phosphor in luminescent screens. With specific regard to this luminescent oxide, $WO_3 \cdot Y_2O_3$, it is to be understood that some luminescence will appear as long as the $WO_3 \cdot Y_2O_3$ (Phase II, Table I and FIGURE 1) is present. As a mixture of the material of Phase II and any of the other phase materials progresses in either direction from the pure $WO_3 \cdot Y_2O_3$ composition, luminescence will, of course, be diluted in proportion to the amount of $WO_3 \cdot Y_2O_3$ which is actually present. The $WO_3 \cdot Y_2O_3$ is a new host lattice and, of course, the luminescent characteristics may be altered by the addition of appropriate impurity elements.

Each of the mixed oxide compositions, $WO_3 \cdot 3Y_2O_3$, $4WO_3 \cdot 9Y_2O_3$ and $8WO_3 \cdot 15Y_2O_3$ are white, well-vitrified ceramic bodies which melt above 2200° C. and are useful as refractories. Refractories can be prepared in a variety of forms by shaping an appropriate mixture of the oxides and a binder and firing at about 1800° C.

The above description has been given for clearness of understanding only and no unnecessary limitations are to be imposed thereby. It will be understood that variations and modifications can be effected within the spirit and scope of the invention as defined hereinabove and as defined in the appended claims.

I claim:
1. A refractory double oxide selected from the group consisting of $WO_3 \cdot 3Y_2O_3$, $4WO_3 \cdot 9Y_2O_3$ and $8WO_3 \cdot 15Y_2O_3$.
2. The double oxide compound whose composition corresponds to the formula $WO_3 \cdot 3Y_2O_3$.
3. The double oxide compound whose composition corresponds to the formula $4WO_3 \cdot 9Y_2O_3$.
4. The double oxide compound whose composition corresponds to the formula $8WO_3 \cdot 15Y_2O_3$.

References Cited by the Examiner

Gmelin-Krauts: Handbuch der Anorganischen Chemie, Band VI, Ableilung 2 (1928–32), page 753.

Hoffman: Lexicon der Anorganischen Verbindungen, Band 2, No. 56–81, page 748.

MAURICE A. BRINDISI, *Primary Examiner.*